(12) United States Patent
Funakoshi et al.

(10) Patent No.: US 9,298,271 B2
(45) Date of Patent: Mar. 29, 2016

(54) MOUNTING DEVICE AND ELECTRONIC APPARATUS

(71) Applicant: FUJITSU COMPONENT LIMITED, Tokyo (JP)

(72) Inventors: Katsuya Funakoshi, Tokyo (JP); Shuji Nakamura, Tokyo (JP); Akio Nakamura, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/446,467

(22) Filed: Jul. 30, 2014

(65) Prior Publication Data

US 2015/0042567 A1 Feb. 12, 2015

(30) Foreign Application Priority Data

Aug. 7, 2013 (JP) ................. 2013-164581

(51) Int. Cl.
*G06F 1/16* (2006.01)
*H05K 5/00* (2006.01)
*H05K 7/00* (2006.01)
*G06F 3/02* (2006.01)

(52) U.S. Cl.
CPC ............ *G06F 3/0202* (2013.01); *G06F 1/1626* (2013.01); *G06F 1/1632* (2013.01); *G06F 1/1669* (2013.01)

(58) Field of Classification Search
CPC ....................................... G06F 1/1632
USPC ....................... 361/679.41–679.44
See application file for complete search history.

(56) References Cited

U.S. PATENT DOCUMENTS

| 5,899,421 A | 5/1999 | Silverman | |
|---|---|---|---|
| 9,025,327 B2* | 5/2015 | Noguchi | G06F 1/1632 361/679.17 |
| 2005/0200608 A1* | 9/2005 | Ulla | G06F 1/1626 345/168 |
| 2006/0274495 A1* | 12/2006 | Nakamura | G06F 1/162 361/679.17 |

FOREIGN PATENT DOCUMENTS

| EP | 2607984 | 6/2013 |
|---|---|---|
| JP | H09-251328 | 9/1997 |
| JP | 2000-010654 | 1/2000 |
| TW | M453337 U | 5/2013 |
| WO | 2014/031135 | 2/2014 |

* cited by examiner

*Primary Examiner* — Anthony Haughton
(74) *Attorney, Agent, or Firm* — IPUSA, PLLC (57) ABSTRACT

A mounting device includes a base member, an attaching mechanism disposed on the base member and configured to detachably attach the base member to a first electronic apparatus, and an accommodating part disposed on the base member and configured to hold a second electronic apparatus placed therein.

6 Claims, 13 Drawing Sheets

FIG.13 a tablet body 6 having a display

MOUNTING DEVICE AND ELECTRONIC APPARATUS

BACKGROUND OF THE INVENTION

1. Field of the Invention

The disclosures herein relate to a mounting device and an electronic apparatus.

2. Description of the Related Art

In recent years, there has been an increase in use of information terminal apparatuses such as tablet PCs (personal computers), which allow input to be made through a software keyboard, without the need for use of a hardware keyboard. A software keyboard, however, provides only limited operability due to the fact that input is made by touching a display screen. Its operability is less satisfactory than the operability of a typical hardware keyboard.

In consideration of these, a certain type of tablet PC is configured to be attachable to a keyboard apparatus, so that the keyboard apparatus and the tablet PC attached thereto are used as one integrated apparatus (see Japanese Patent Application Publication No. 2000-010654, for example). Another type of tablet PC is configured to be attached to a stand, and input is made by use of a keyboard device that is separate from the tablet PC (see Japanese Patent Application Publication h9-251328, for example).

Due to superior portability, a tablet PC is used in various situations. When input is made by only one person, for example, a convenient mode of use may involve the tablet PC that is integrated with a keyboard apparatus, such that the tablet PC is used similarly to a notebook-type PC (which is hereinafter referred to as a first mode of use).

On the other hand, there may be a situation in which the display screen of a tablet PC needs to be seen by a large number of people in a meeting or the like in which people gather. In such a situation, a convenient mode of use may be such that the tablet PC is attached to a stand, and can be carried to a place where the people have a clear view.

A conventional tablet PC that is attachable to a keyboard cannot be used in the second mode of use. A tablet PC that is attachable to a stand cannot be used in the first mode of use.

There may be a need, among various other needs, for a mounting device and an electronic apparatus that can cope with various modes of use.

SUMMARY OF THE INVENTION

It is a general object of the present invention to provide a mounting device and an electronic apparatus that substantially obviate one or more problems caused by the limitations and disadvantages of the related art.

According to an embodiment, a mounting device includes a base member, an attaching mechanism disposed on the base member and configured to detachably attach the base member to a first electronic apparatus, and an accommodating part disposed on the base member and configured to hold a second electronic apparatus placed therein.

According to an embodiment, an electronic apparatus includes a first electronic apparatus, and a mounting device configured to be detachably attached to the first electronic apparatus and further configured to hold a second electronic apparatus placed therein, wherein the mounting device includes a base member, an attaching mechanism configured to detachably attach the base member to the first electronic apparatus, and an accommodating part disposed on the base member and configured to hold the second electronic apparatus placed therein.

According to at least one embodiment, the first electronic apparatus and the second electronic apparatus can be used in various modes of use.

BRIEF DESCRIPTION OF THE DRAWINGS

Other objects and further features of the present invention will be apparent from the following detailed description when read in conjunction with the accompanying drawings, in which.

DESCRIPTION OF EMBODIMENTS

In the following, various non-limiting embodiments of the present invention will be described with reference to the accompanying drawings.

In illustrations provided in the drawings, the same or corresponding members or elements are referred to by the same or corresponding numerals, and duplicate descriptions thereof will be omitted. Further, the drawings are not provided for the purpose of illustrating size ratios between members or elements unless otherwise specified. Specific sizes may be determined by those skilled in the art by referring to the non-limiting embodiments that will be described hereinafter.

Further, the embodiments that will be described hereinafter are examples only that do not limit the invention. Features and combinations thereof described in these embodiments may not necessarily be essential to the invention.

Figure 1:
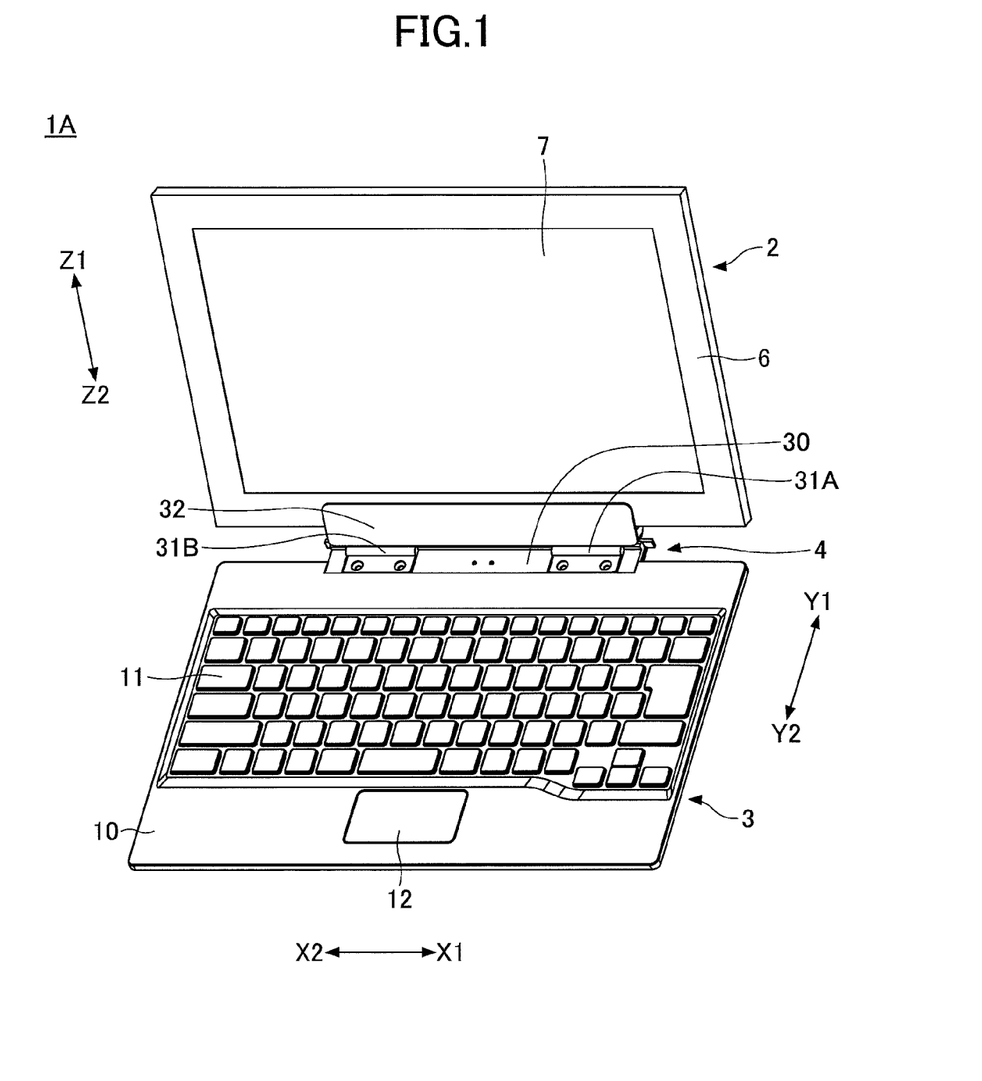
FIG. 1 is an oblique perspective view of an embodiment of an electronic apparatus.

FIG. 1 is a drawing illustrating an embodiment of an electronic apparatus 1A. In the embodiment, the electronic apparatus 1A that includes a tablet PC (personal computer) 2 and a keyboard 3 both serving as electronic apparatuses will be used as an example.

The tablet PC 2 is portable. A tablet body 6 having a display device 7 is attachable to a keyboard apparatus 3. The keyboard apparatus 3 includes a keyboard body 10, and further includes keys 11 and a scroll pad 12 arranged on the keyboard body 10.

The keyboard body 10 has a flat box shape. The keys 11 are arranged at and around the center of the keyboard body 10. The scroll pad 12 for moving a cursor and performing other actions is disposed on the keyboard body 10 at a front side.

Figure 5:
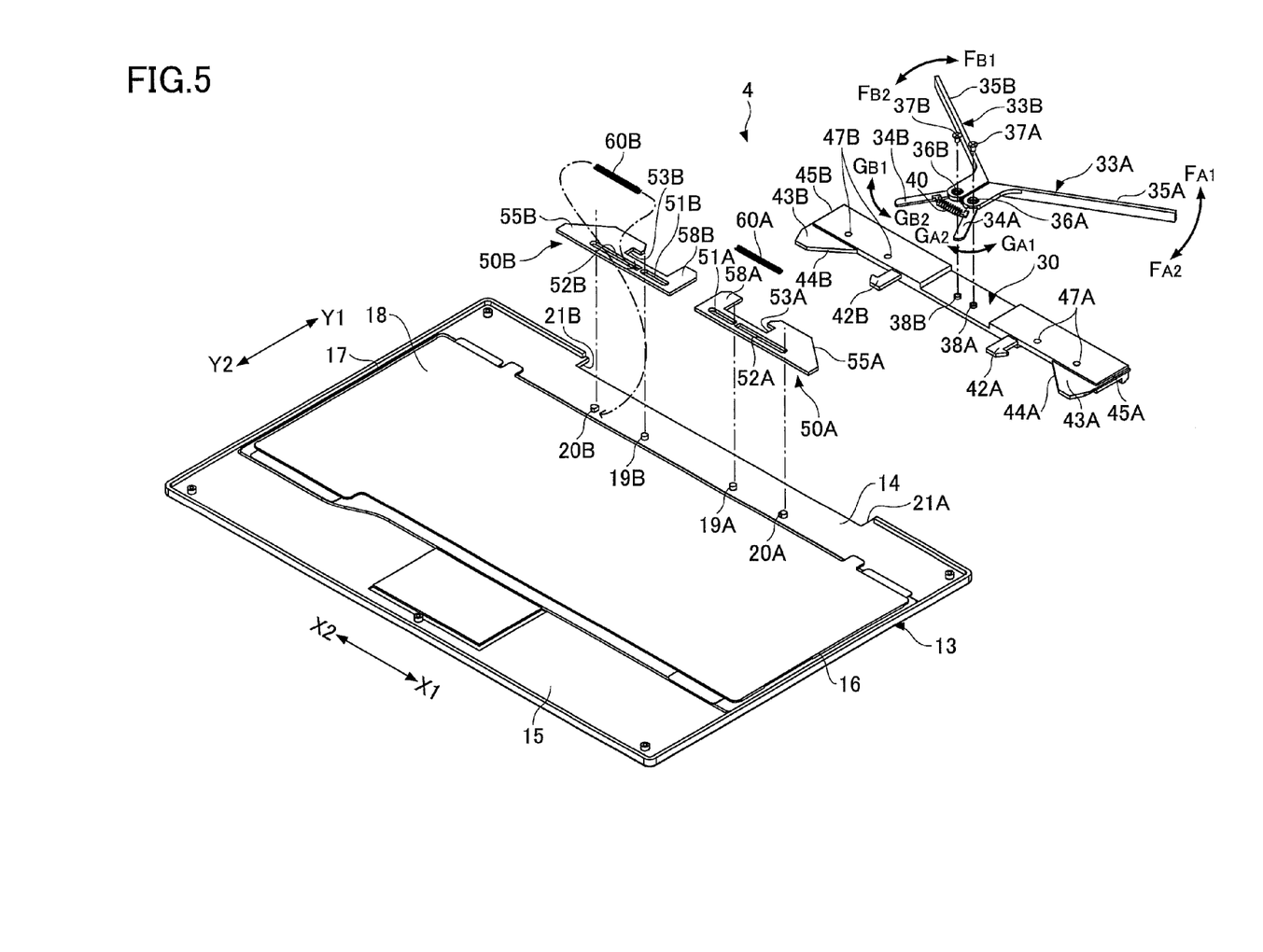
FIG. 5 is an oblique perspective view of an embodiment of the mounting device.

A frame 13 illustrated in FIG. 5 is disposed inside the keyboard body 10. The frame 13 has a frame shape, and includes a rear bar 14, a front bar 15, and side bars 16 and 17. The frame 13 has an opening 18 where the keys 11 are disposed. A first slide member 50A and a second slide member 50B that are part of a mounting device 4, which will be described later, are attached to the rear bar 14.

In the following description, some elements are symmetrically arranged in the X1-X2 direction illustrated in the drawings. An element that is arranged toward the X1 side is given a name that start with the term "first" and a reference numeral that ends with "A". An element that is arranged toward the X2 side is given a name that start with the term "second" and a reference numeral that ends with "B". Further, those elements that are symmetrically arranged in the X1-X2 direction may sometimes be collectively referred to without using the term "first" and the term "second".

In the following, the mounting device 4 will be described.

The mounting device 4 includes a base member 30 and an accommodating part 32. The base member 30 is detachably attached to the keyboard. The accommodating part 32 holds the tablet PC 2 placed therein in a detachable manner.

Figure 2:
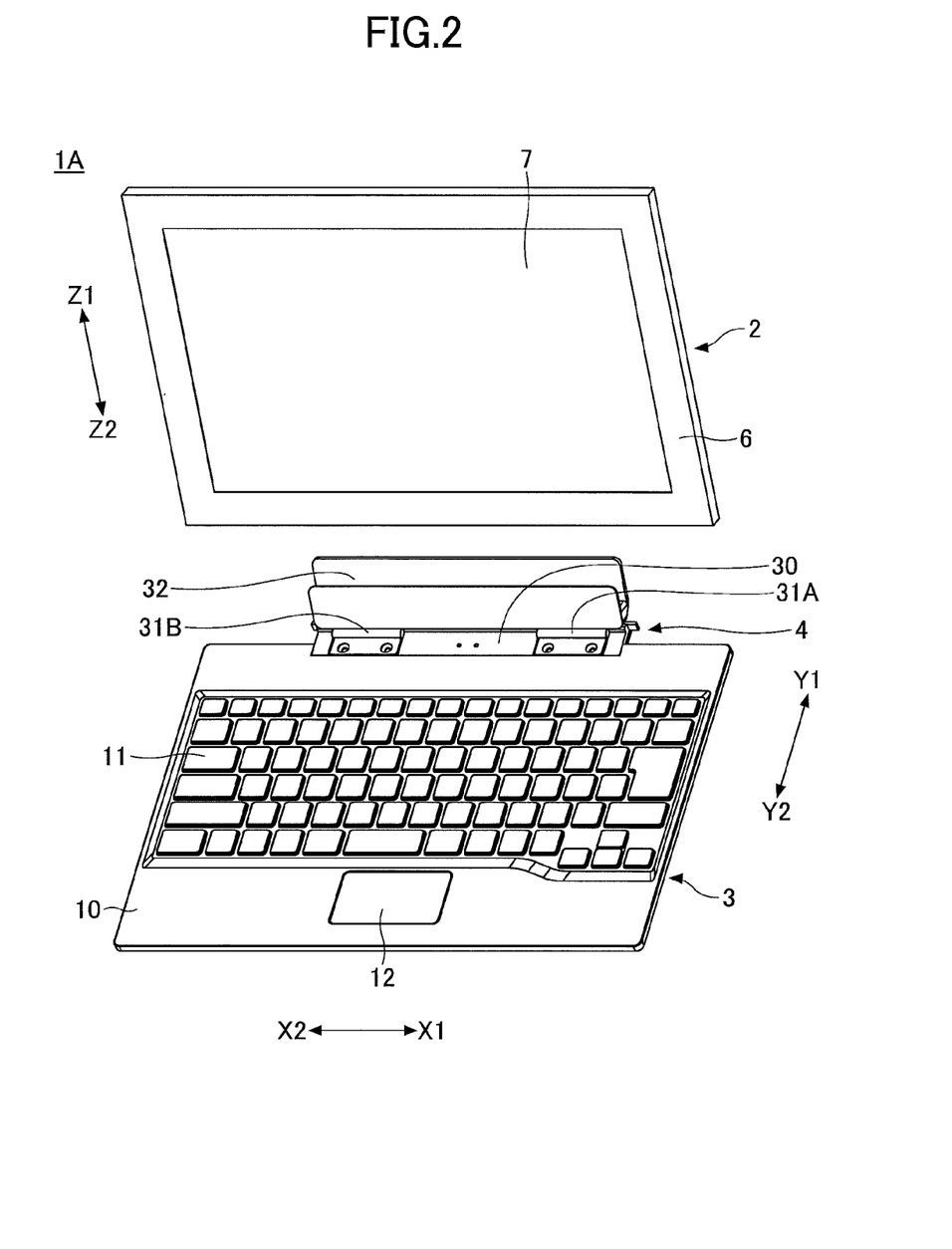
FIG. 2 is an oblique perspective view of the electronic apparatus as appears when a tablet PC is detached from a mounting device.
Figure 3:
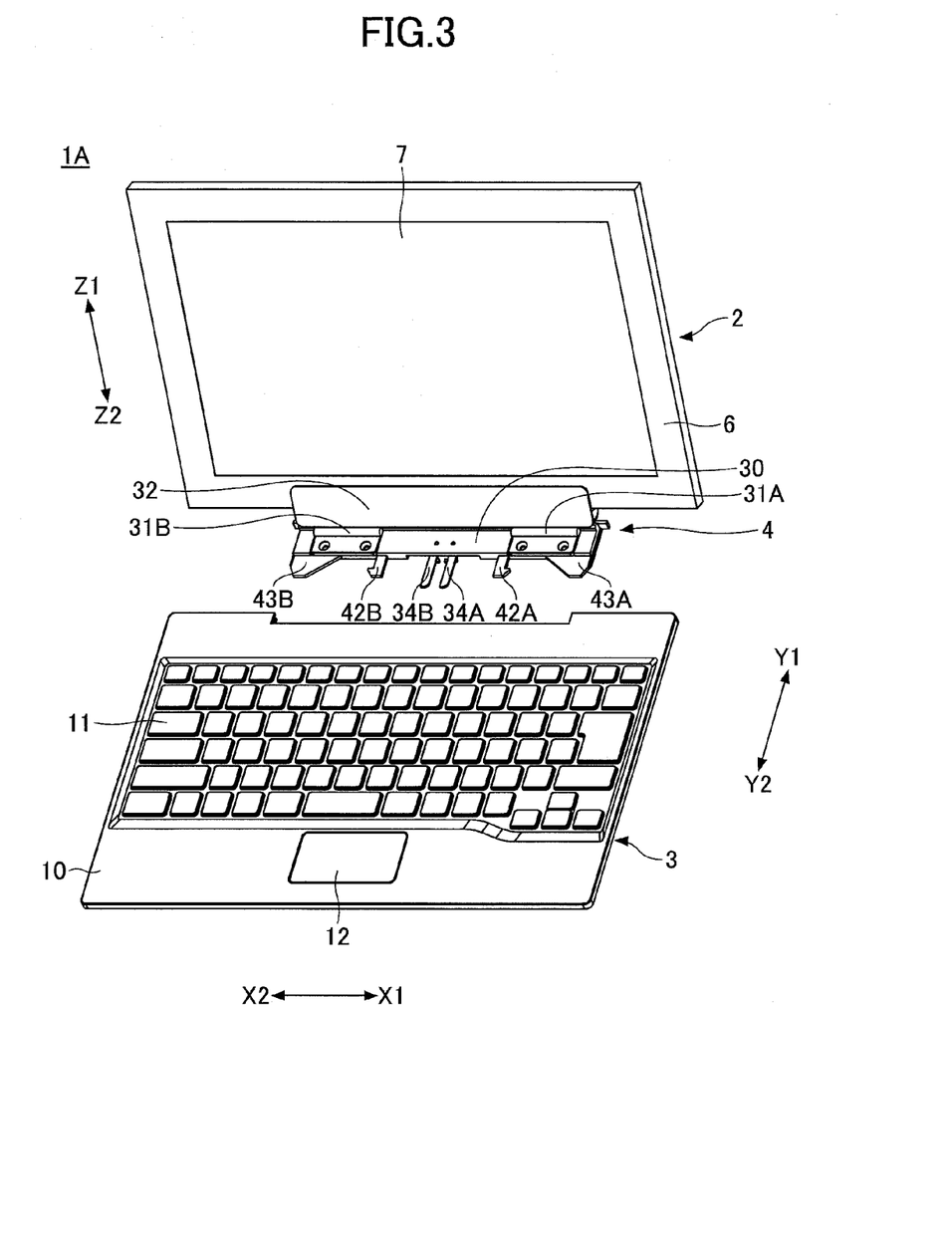
FIG. 3 is an oblique perspective view of the electronic apparatus as appears when the mounting device is detached from a keyboard apparatus.
Figure 4:
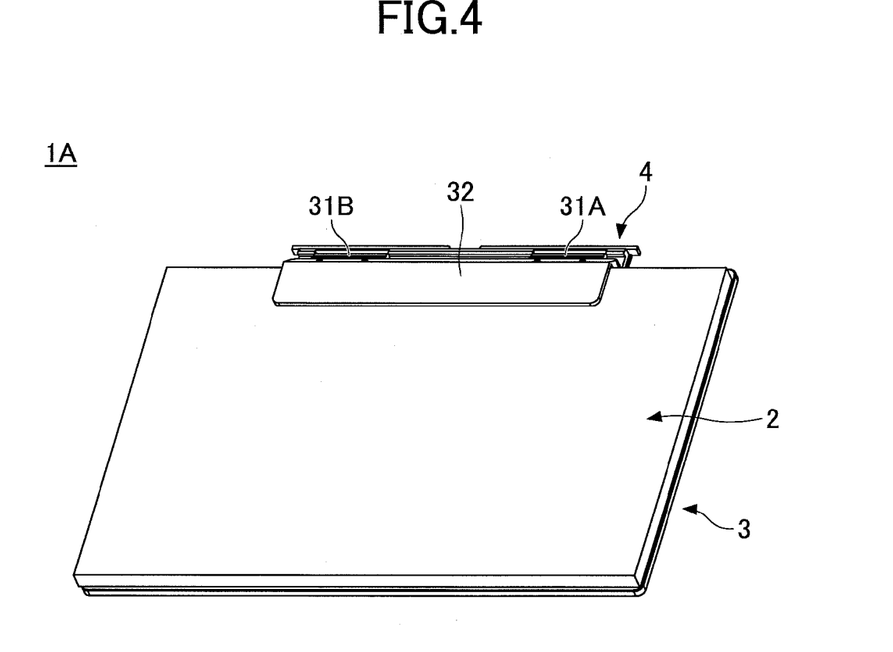
FIG. 4 is an oblique perspective view of the electronic apparatus as appears when the tablet PC is folded flat against the keyboard apparatus.

FIG. 1 illustrates the mounting device 4 that is attached to the keyboard apparatus 3 with the tablet PC 2 placed in the accommodating part 32. FIG. 2 illustrates the mounting device 4 that is attached to the keyboard apparatus 3 with the tablet PC 2 detached from the accommodating part 32. FIG. 3 illustrates the mounting device 4 that is detached from the keyboard apparatus 3. FIG. 4 illustrates the tablet PC 2 folded flat against the keyboard apparatus 3 via the hinge function of the mounting device 4.

As illustrated in FIG. 1 and FIG. 4, the tablet PC 2 may be attached to the mounting device 4 that is attached to the keyboard apparatus 3. With this arrangement, the electronic apparatus 1A can be used in the same manner as a notebook-type PC (personal computer).

The attaching mechanism of the mounting device 4 that allows the mounting device 4 to be detachably attached to the keyboard apparatus 3 includes the base 30, levers 33A and 33B, and slide members 50A and 50B as illustrated in FIG. 1 through FIG. 5.

The base member 30 is made of metal, hard resin, or the like. The base member 30 has a rectangular shape having the long sides thereof extending in the X1-X2 direction. The base member 30 has a first protruding part 43A, a first engaging click 42A, and first hinge-mounting holes 47A formed therein at the X1 side thereof. The base member 30 has a second protruding part 43B, a second engaging click 42B, and second hinge-mounting holes 47B formed therein at the X2 side thereof.

The engaging clicks 42A and 42B are configured to protrude in a Y2 direction from the base member 30. The tips of the engaging clicks 42A and 42B have an L-letter shape to form a hook.

The protruding parts 43A and 43B are disposed nearer to the opposite ends of the base member 30 than the engaging clicks 42A and 42B are. The protruding parts 43A and 43B have oblique edges 44A and 44B at the inner side thereof.

Hinge parts 31A and 31B are mounted to the base member 30 by use of the hinge-mounting holes 47A and 47B, respectively. The hinge parts 31A and 31B are securely attached to the base member 30 by screws or the like inserted into the hinge-mounting holes 47A and 47B. The hinge parts 31A and 31B are also fixedly attached to the accommodating part 32. As a result, the accommodating part 32 is rotatable relative to the base member 30.

The hinge parts 31A and 31B are configured such that the accommodating part 32 is fixedly positioned at a desired angle with respect to the base member 30. Accordingly, the hinge parts 31A and 31B can fixedly position the tablet PC 2 at a desired tilt angle with respect to the keyboard apparatus 3 in addition to holding the tablet PC 2 folded flat against the keyboard apparatus 3 as illustrated in FIG. 4. This arrangement ensures satisfactory viewability and operability when using the tablet PC 2 attached to the mounting device 4.

The lever members 33A and 33B have an L-letter shape as viewed from above. The lever members 33A and 33B include operating levers 35A and 35B and lock release levers 34A and 34B shorter than the operating levers 35A and 35B. The operating lever portions 35A and 35B are connected to the lock release lever portions 34A and 34B. In the lever members 33A and 33B, shaft holes 36A and 36B are formed at the connecting points between the operating lever portions 35A and 35B and the lock release lever portions 34A and 34B, respectively.

A first pin 37A that is placed through the first shaft hole 36A is fixedly attached to a first mounting hole 38A formed in the base member 30, so that the first lever member 33A is attached to and rotatable relative to the base member 30. A second pin 37B that is placed through the second shaft hole 36B is fixedly attached to a second mounting hole 38B formed in the base member 30, so that the second lever member 33B is attached to and rotatable relative to the base member 30.

Rotating the first operating lever 35A in a direction $F_{A1}$ illustrated in FIG. 5 causes the first lock release lever 34A to rotate in a direction $G_{A1}$. Rotating the first operating lever 35A in a direction $F_{A2}$ illustrated in FIG. 5 causes the first lock release lever 34A to rotate in a direction $G_{A2}$.

Rotating the second operating lever portion 35B in a direction $F_{B1}$ illustrated in FIG. 5 causes the second lock release lever portion 34B to rotate in a direction $G_{B1}$. Rotating the second operating lever portion 35B in a direction $F_{B2}$ illustrated in FIG. 5 causes the second lock release lever portion 34B to rotate in a direction $G_{B2}$.

Figure 6:
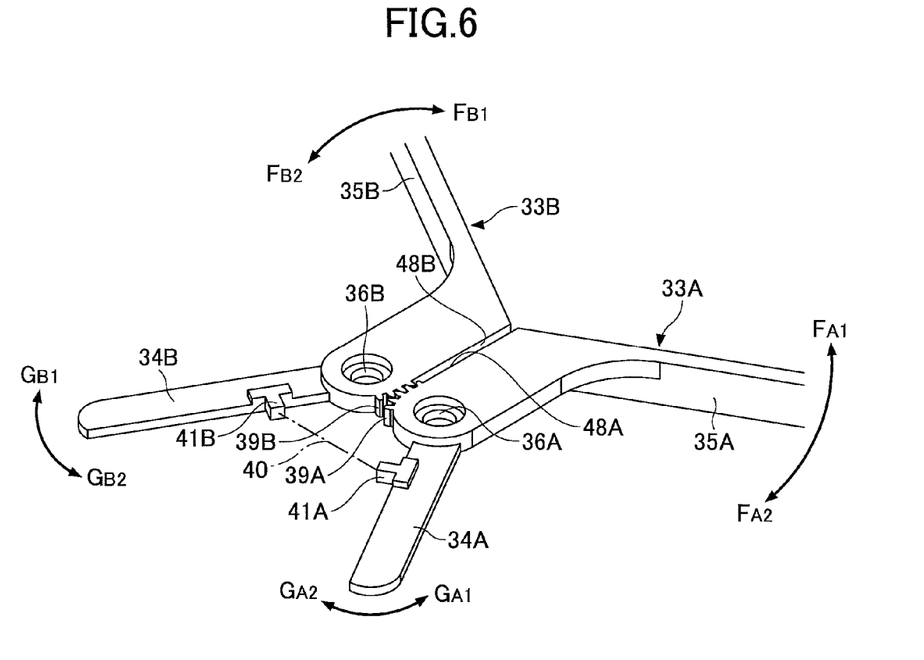
FIG. 6 is a drawing illustrating an enlarged view of lock release lever portions and their periphery.

FIG. 6 is a drawing illustrating an enlarged view of the lock release levers 34A and 34B and their periphery. As illustrated in FIG. 6, gears 39A and 39B are formed on the lever members 33A and 33B near the shaft holes 36A and 36B, respectively. The first gear portion 39A and the second gear portion 39B are engaged with each other, so that at the time of rotational movement, the first lever member 33A and the second lever member 33B rotate in unison.

The first lock release lever portion 34A has a first spring mounting portion 41A, and the second lock release lever portion 34B has a second spring mounting portion 41B. A lever spring 40 is disposed between the first spring mounting portion 41A and the second spring mounting portion 41B.

The lever spring 40 pushes the first lock release lever portion 34A and the second lock release lever portion 34B away from each other. Namely, the lever spring 40 urges the first lever member 33A in a counterclockwise direction around the first shaft hole 36A, and urges the second lever member 33B in a clockwise direction around the second shaft hole 36B.

The lever members 33A and 33B have contacting portions 48A and 48B, respectively. The contacting portions 48A and 48B are situated closer to the operating lever portions 35A and 35B, respectively, than the shaft holes 36A and 36B are. Rotation of the first lever member 33A in the $F_{A1}$ direction and rotation of the second lever member 33B in the $F_{B1}$ direction result in the first contacting portion 48A and the second contacting portion 48B coming in contact with each other.

The fact that the first contacting portion 48A and the second contacting portion 48B come in contact with each other causes the rotational movement of the lever members 33A and 33B to be stopped despite the presence of the lever spring 40 exerting force to rotate the lever members 33A and 33B around the shaft holes 36A and 36B, respectively. In the state in which the contacting portions 48A and 48B are in contact with each other, the lock release lever portions 34A and 34B extend in a V-letter shape, and so do the operating lever portions 35A and 35B (see FIG. 5 and FIG. 10). This state will hereinafter be referred to as a lever-open state.

Figure 7:
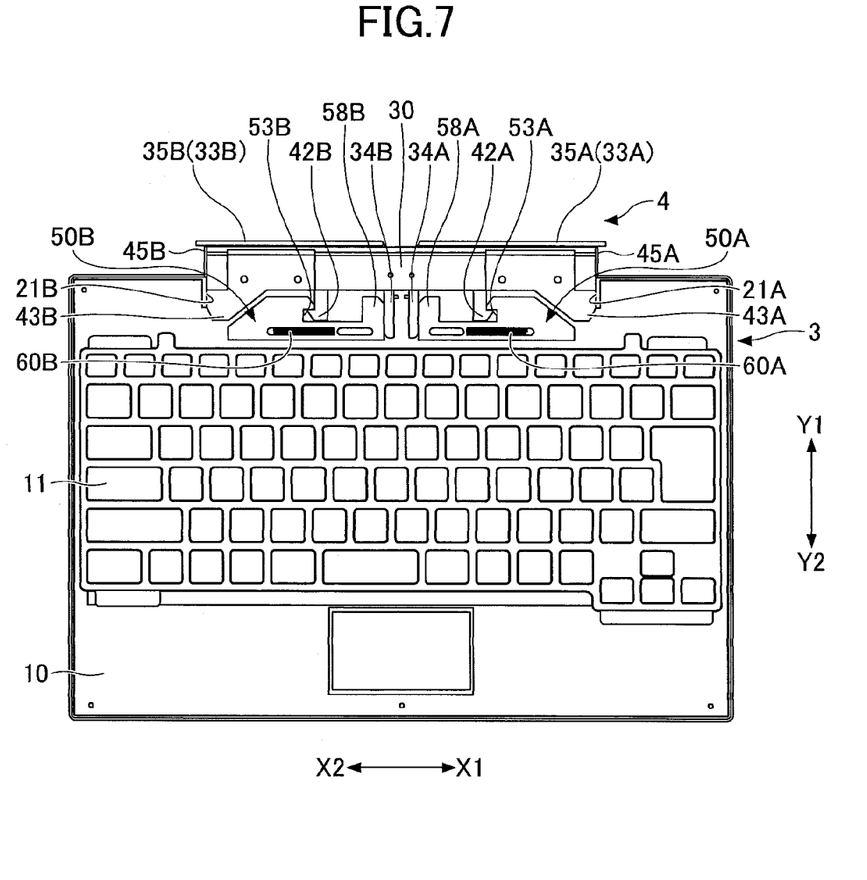
FIG. 7 is a plan view illustrating how the mounting device works.

Rotation of the first operating lever portion 35A in the $F_{A2}$ direction and rotation of the second operating lever portion 35B in the $F_{B2}$ direction cause the operating lever portions 35A and 35B to be in contact with the side face of the base member 30 (see FIG. 7). This state will hereinafter be referred to as a lever-closed state. In the lever-closed state, the first lock release lever portion 34A and the second lock release lever portion 34B extend in the Y1-Y2 direction.

As illustrated in FIG. 5, the slide members 50A and 50B are plate-shaped members, which are disposed on the frame 13 of the keyboard apparatus 3. The slide members 50A and 50B have guide holes 51A and 51B, elongated holes 52A and 52B, engaging recesses 53A and 53B, oblique sides 55A and 55B, and operated parts 58A and 58B, respectively.

The guide holes 51A and 51B are elongated holes extending in the X1-X2 direction. The rear bar of the frame 13 has guide pins 19A and 19B standing thereon. The guide pins 19A and 19B are inserted into the guide holes 51A and 51B, respectively, when the slide members 50A and 50B are mounted on the rear bar 14.

The elongated holes 52A and 52B extend in the X1-X2 direction. The rear bar 14 has pins 20A and 20B standing thereon. The pins 20A and 20B are inserted into the elongated holes 52A and 52B, respectively, when the slide members 50A and 50B are mounted on the rear bar 14.

Slide springs 60A and 60B are placed in the elongated holes 52A and 52B, respectively. To be more specific, the first slide spring 60A placed in the first elongated hole 52A has the end thereof facing the X1 direction that is fixedly attached to the first pin 20A inserted into the first elongated hole 52A, and has the end thereof facing the X2 direction that is fixedly attached to an interior wall portion of the first elongated hole 52A situated toward the X2 direction.

The first slide spring 60A urges the first slide member 50A toward the X2 direction. The movement of the first slide member 50A toward the X2 direction is stopped when the first guide pin 19A comes in contact with an interior wall portion of the first guide hole 51A situated toward the X1 direction.

The second slide spring 60B placed in the second elongated hole 52B has the end thereof facing the X2 direction that is fixedly attached to the second pin 20B inserted into the second elongated hole 52B, and has the end thereof facing the X1 direction that is fixedly attached to an interior wall portion of the second elongated hole 52B situated toward the X1 direction.

The second slide spring 60B urges the second slide member 50B toward the X1 direction. The movement of the second slide member 50B toward the X1 direction is stopped when the second guide pin 19B comes in contact with an interior wall portion of the second guide hole 51B situated toward the X2 direction.

The engaging recess parts 53A and 53B are situated at positions matching the positions of the engaging clicks 42A and 42B formed on the base member 30, respectively. The engaging clicks 42A and 42B formed on the base member 30 are engaged with the engaging recess parts 53A and 53B, respectively, when the mounting device 4 is mounted on the keyboard apparatus 3. Engagement of the engaging clicks 42A and 42B with the respective engaging recess parts 53A and 53B ensures that the mounting device 4 is fixedly mounted on the keyboard apparatus 3.

The first oblique side 55A is situated on the outer side of the first slide member 50A (i.e., on the side facing the X1 direction). The first oblique side 55A is configured to come in contact with the first oblique edge 44A formed on the base member 30 when the mounting device 4 is mounted on the keyboard apparatus 3.

The second oblique side 55B is situated on the outer side of the second slide member 50B (i.e., on the side situated toward the X2 direction). The second oblique side 55B is configured to come in contact with the second oblique edge 44B formed on the base member 30 when the mounting device 4 is mounted on the keyboard apparatus 3.

The first operated part 58A is situated on the inner side of the first slide member 50A (i.e., on the side situated toward the X2 direction). The first operated part 58A is urged toward the X1 direction by the first lever member 33A (and the first lock release lever portion 34A) mounted on the base member 30 when the mounting device 4 is to be detached from the keyboard apparatus 3.

The second operated part 58B is situated on the inner side of the second slide member 50B (i.e., on the side situated toward the X1 direction). The second operated part 58B is urged toward the X2 direction by the second lever member 33B (and the second lock release lever portion 34B) mounted on the base member 30 when the mounting device 4 is to be detached from the keyboard apparatus 3.

In the following, a description will be given of the operations performed to attach and detach the mounting device 4 to and from the keyboard apparatus 3 with reference to FIG. 7 through FIG. 11. In FIG. 7 through FIG. 11, the hinge parts 31A and 31B and the accommodating part 32 are not illustrated for the same of convenience of illustration.

An operation to detach the mounting device from the keyboard apparatus 3 will be described first. FIG. 7 illustrates the mounting device 4 attached to the keyboard apparatus 3. This state will hereinafter be referred to as an attached state.

In the attached state, the engaging clicks 42A and 42B of the base member 30 are engaged with the engaging recess parts 53A and 53B of the slide members 50A and 50B, respectively, so that the base member 30 is prevented from moving in the Y1 direction. Further, the slide members 50A and 50B are inwardly urged by the slide springs 60A and 60B, respectively. With this arrangement, the mounting device 4 is securely attached to the keyboard apparatus 3 without rattling.

In the attached state, the first lock release lever portion 34A is in contact with the first operated part 58A of the first slide member 50A, and the second lock release lever portion 34B is in contact with the second operated part 58B of the second slide member 50B.

As was previously described, the lock release lever portions 34A and 34B are urged by the lever spring 40 in the directions to move apart from each other. Namely, as illustrated in FIG. 5, the first lock release lever portion 34A is urged in the $G_{A1}$ rotational direction by the lever spring 40, and the second lock release lever portion 34B is urged in the $G_{B1}$ rotational direction by the lever spring 40.

Further, the first operated part 58A (i.e., the first slide member 50A) is urged toward the X2 direction by the first slide spring 60A, and the second operated part 58B is urged toward the X1 direction by the second slide spring 60B. The urging force exerted by the slide springs 60A and 60B is designed to be stronger than the urging force exerted by the lever spring 40.

Namely, the force with which the first operated part 58A urges the first lock release lever portion 34A toward the X2 direction is stronger than the force with which the first lock release lever portion 34A urges the first operated part 58A toward the $G_{A1}$ direction. Similarly, the force with which the second operated part 58B urges the second lock release lever portion 34B is stronger than the force with which the second lock release lever portion 34B urges the second operated part 58B.

In the attached state, the first slide member 50A is situated as far as it can be pushed in the X2 direction by the urging force of the slide spring 60A. Further, the first lever member 33A is urged by the first operated part 58A that is urged toward the X2 direction by the first slide spring 60A, so that the first lever member 33A is urged in the clockwise direction around the first shaft hole 36A. The second slide member 50B is pushed toward the X1 direction as far as it can go, which causes the second lock release lever portion 34B to be urged by the second operated part 58B, so that the second lever member 33B is urged in the counterclockwise direction around the second shaft hole 36B.

In the attached state, the lever members 33A and 33B are situated such that the operating lever portions 35A and 35B are placed along the face of one of the long sides of the base member 30 (in the lever-closed state), with the lock release lever portions 34A and 34B extending in the Y2 direction from the base member 30.

Figure 8:
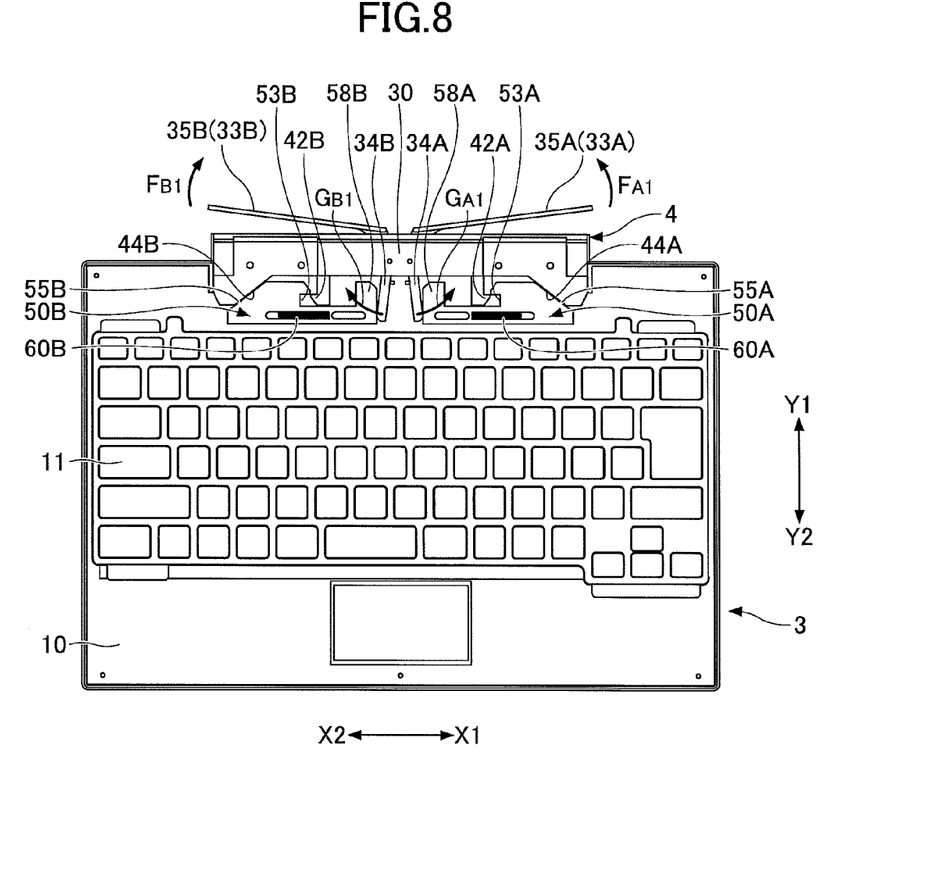
FIG. 8 is a plan view illustrating how the mounting device works.

In order to detach the mounting device 4 from the keyboard apparatus 3 according to the present embodiment, the first operating lever portion 35A is rotated in the counterclockwise direction (i.e., in the $F_{A1}$ direction illustrated in FIG. 8), and the second operating lever portion 35B is rotated in the clockwise direction (i.e., in the $F_{B1}$ direction illustrated in FIG. 8). As was previously described, the gear portions 39A and 39B are engaged with each other so that the first lever member 33A and the second lever member 33B rotate in conjunction with each other. Because of this, operating either the first lever member 33A or the second lever member 33B alone may suffice to detach the mounting device 4 from the keyboard apparatus 3.

Rotating the first operating lever portion 35A (i.e., the first lever member 33A) in the $F_{A1}$ direction causes the first lock release lever portion 34A to rotate in the $G_{A1}$ direction (see FIG. 5 and FIG. 8). As a result, the first operated part 58A is pushed toward the X1 direction by the first lock release lever portion 34A. The first slide member 50A pushed by the first lock release lever portion 34A starts moving in the X1 direction against the force exerted by the first slide spring 60A.

Similarly, rotating the second operating lever portion 35B (i.e., the second lever member 33B) in the $F_{B1}$ direction causes the second lock release lever portion 34B to rotate in the $G_{B1}$ direction (see FIG. 5). As a result, the second operated part 58B is pushed by the second lock release lever portion 34B. The second slide member 50B pushed by the second lock release lever portion 34B starts moving in the X2 direction against the force exerted by the second slide spring 60B.

Figure 9:
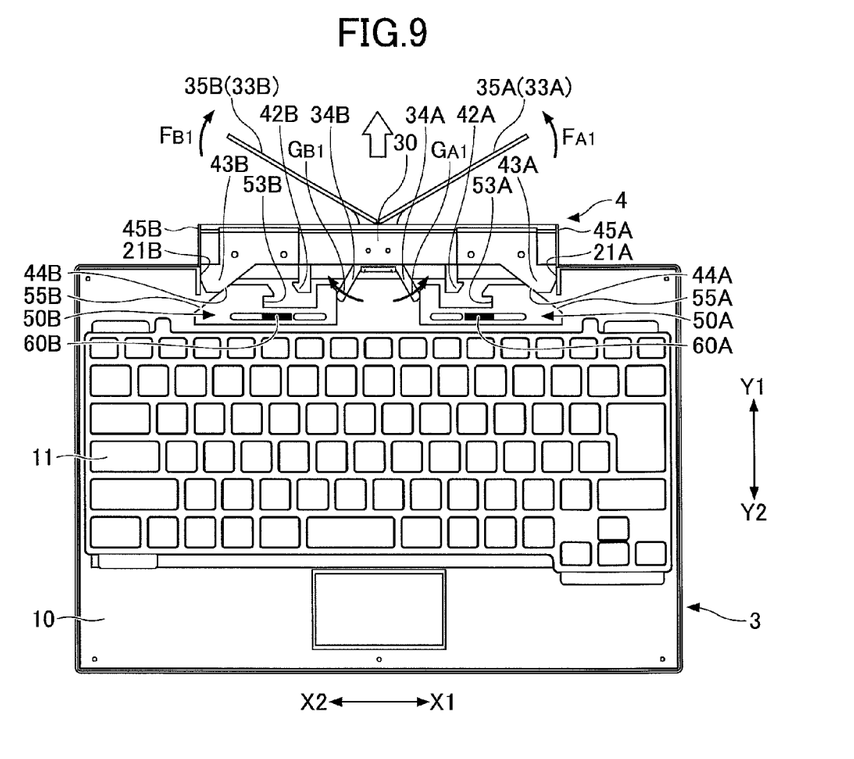
FIG. 9 is a plan view illustrating how the mounting device works.

When the first slide member 50A moves in the X1 direction and the second slide member 50B moves in the X2 direction as described above, the engaging recess parts 53A and 53B eventually disengage from the engaging clicks 42A and 42B, respectively. FIG. 9 illustrates the state in which the engaging clicks 42A and 42B are disengaged from the engaging recess parts 53A and 53B, respectively.

Upon disengagement of the engaging clicks 42A and 42B from the respective engaging recess parts 53A and 53B, the mounting device 4 is released from the keyboard apparatus 3 so that the mounting device 4 can be separated from the keyboard apparatus 3.

As illustrated in FIG. 8, the movement of the first slide member 50A in the X1 direction causes the first oblique side 55A of the first slide member 50A to come in contact with the first oblique edge 44A of the base member 30. Due to the slant of the oblique edge 44A and the oblique side 55A, the movement of the first slide member 50A in the X1 direction causes the base member 30 to move in the Y1 direction.

Further, the movement of the second slide member 50B in the X2 direction causes the second oblique side 55B of the second slide member 50B to come in contact with the second oblique edge 44B of the base member 30. The slant of the oblique edge 44B and the oblique side 55B also serves to cause the base member 30 to move in the Y1 direction as the second slide member 50B moves in the X2 direction.

Accordingly, upon disengagement of the engaging clicks 42A and 42B from the respective engaging recess parts 53A and 53B, the outward sliding movements of the slide members 50A and 50B result in the base member 30 being separated from the keyboard apparatus 3 with movement in the Y1 direction.

In the manner as described above, the mounting device 4 of the present embodiment is separated from the keyboard apparatus 3 by operating the operating lever portions 35A and 35B (i.e., the lever members 33A and 33B) to release the lock between the keyboard apparatus 3 and the mounting device 4. This arrangement allows the mounting device 4 to be easily separated from the keyboard apparatus 3.

Further, when the mounting device 4 is separated from the keyboard apparatus 3, side edges 45 of the base member 30 are guided by guide parts 21A and 21B formed on the frame 13. This arrangement allows the mounting device 4 to be smoothly separated from the keyboard apparatus 3.

Figure 10:
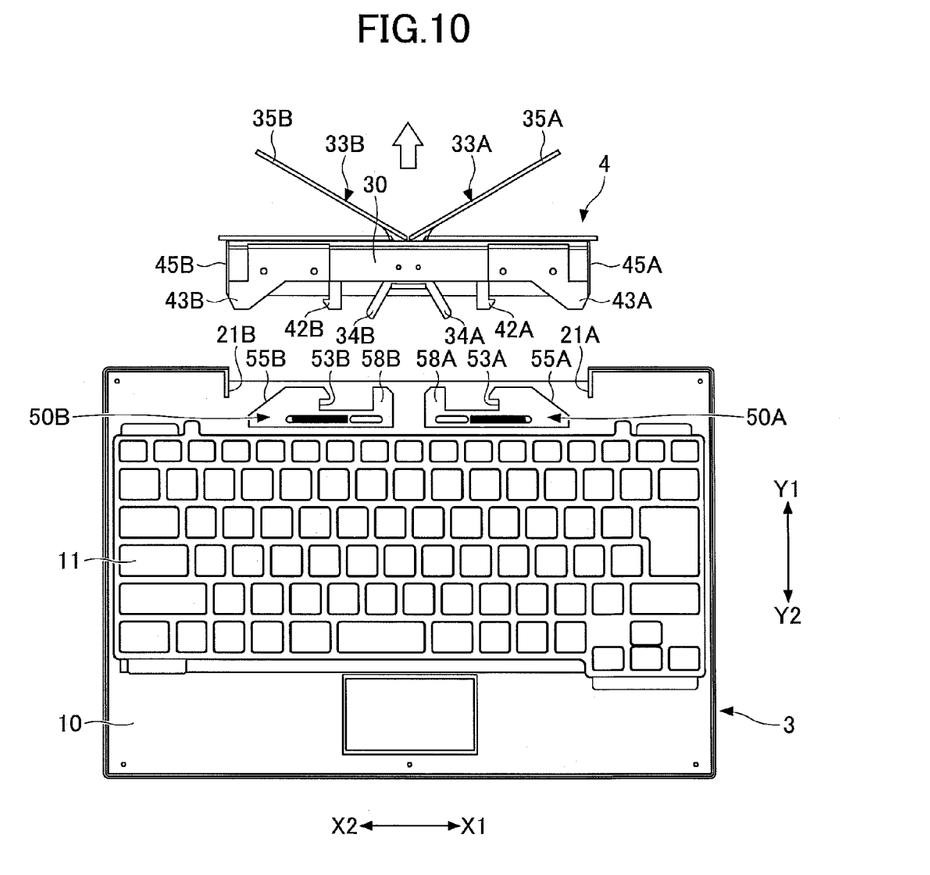
FIG. 10 is a plan view illustrating how the mounting device works.

FIG. 10 illustrates the mounting device 4 that is detached from the keyboard apparatus 3. In the state in which the mounting device 4 is detached from the keyboard apparatus 3, the lock release lever portions 34A and 34B and the operating lever portions 35A and 35B are placed in the lever-open state. This is due to the force exerted by the lever spring 40 that is disposed between the first lock release lever portion 34A and the second lock release lever portion 34B.

In the state in which the mounting device 4 is separated from the keyboard apparatus 3, the operating lever portions 35A and 35B extend at oblique angles from the base member 30 on the rear side thereof. With this arrangement, the operating lever portions 35A and 35B serve as a base to support the mounting device 4.

Accordingly, as illustrated in FIG. 3, the mounting device 4 can hold the tablet PC 2 mounted in the accommodating part 32 even when the mounting device 4 is separated from the keyboard apparatus 3. Further, the angle of the tablet PC 2 with respect to the base member 30 can be adjusted by use of the hinge parts 31A and 31B.

Figure 11:
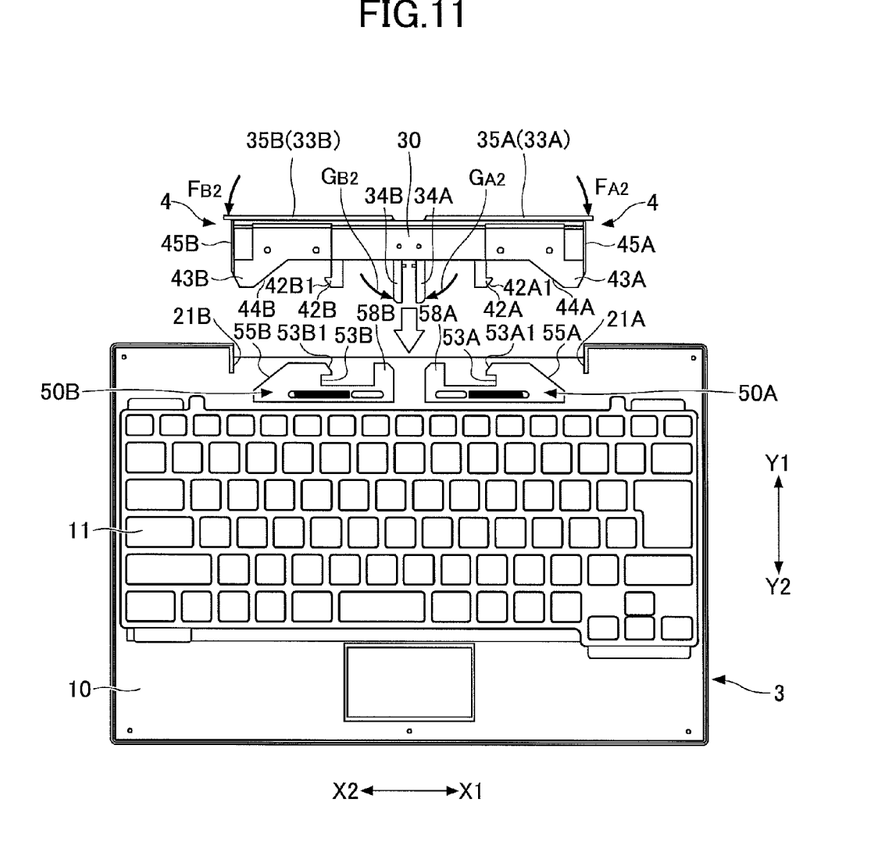
FIG. 11 is a plan view illustrating how the mounting device works.

In order to attach the mounting device 4 to the keyboard apparatus 3, the operating lever portions 35A and 35B are placed in the lever-closed state. To be more specific, the first operating lever portion 35A (of the first lever member 33A) is rotated in the clockwise direction (i.e., the $F_{A2}$ direction) until the first operating lever portion 35A comes in contact with the base member 30 as illustrated in FIG. 11. Also, the second operating lever portion 35B (of the second lever member 33B) is rotated in the counterclockwise direction (i.e., the $F_{B2}$ direction) until the second operating lever portion 35B comes in contact with the base member 30.

With this operation, the first lock release lever portion 34A is rotated in the $G_{A2}$ direction, and the second lock release lever portion 34B is rotated in the $G_{B2}$ direction. Consequently, the lock release lever portions 34A and 34B extend in the Y2 direction.

Subsequently, the mounting device 4 is inserted into the keyboard apparatus 3. To be more specific, the first side edge 45A is aligned with the first guide part 21A, and the second side edge 45B is aligned with the second guide part 21B, followed by sliding the mounting device 4 in the Y2 direction for insertion into the keyboard apparatus 3. In so doing, the side edges 45A and 45B are guided by the guide parts 21A and 21B, which allows the mounting device 4 to be smoothly inserted into the keyboard apparatus 3.

Upon the mounting device 4 being inserted into the keyboard apparatus 3, the first oblique edge 44A of the base member 30 comes in contact with the first oblique side 55A of the first slide member 50A, and, also, the second oblique edge 44B comes in contact with the second oblique side 55B of the second slide member 50B. The lock release lever portions 34A and 34B are inserted into a gap between the first operated part 58A and the second operated part 58B. The engaging clicks 42A and 42B are inserted into gaps between the engaging recess parts 53A and 53B and the operated parts 58A and 58B, respectively.

When the mounting device 4 is inserted into the keyboard apparatus 3, tapered parts 42A1 and 42B1 of the engaging clicks 42A and 42B come in contact with tapered parts 53A1 and 53B1 of the engaging recess parts 53A and 53B, respectively. Movement of the mounting device 4 in the Y2 direction causes the tapered parts 42A1 and 42B1 of the engaging clicks 42A and 42B to push the tapered parts 53A1 and 53B1 of the engaging recess parts 53A and 53B, respectively, thereby causing the slide members 50A and 50B to move outwardly against the forces exerted by the slide springs 60A and 60B, respectively.

Eventually, the tapered parts 42A1 and 42B1 go past the tapered parts 53A1 and 53B1, respectively, as a result of the movement of the mounting device 4 in the Y2 direction. When this happens, the slide members 50A and 50B move inwardly due to the forces exerted by the slide springs 60A and 60B, so that the engaging clicks 42A and 42B are engaged with the engaging recess parts 53A and 53B, respectively. Engagement of the engaging clicks 42A and 42B with the respective engaging recess parts 53A and 53B ensures that the mounting device 4 is fixedly mounted on the keyboard apparatus 3.

The sliding movement of the first slide member 50A in the X2 direction causes the first operated part 58A to push the first lock release lever portion 34A in the X2 direction. The sliding movement of the second slide member 50B in the X1 direction causes the second operated part 58B to push the second lock release lever portion 34B in the X1 direction. With this arrangement, the rotations of the lever members 33A and 33B in the $G_{A1}$ and $G_{B1}$ directions, respectively, are stopped by the slide members 50A and 50B, respectively. Through the series of operations described above, the mounting device 4 is placed in the attached state.

The electronic apparatus 1A including the mounting device 4 described above can be used in the same manner as a notebook-type PC is used when the mounting device 4 is attached to the keyboard apparatus 3, and the tablet PC 2 is mounted on the mounting device 4 as illustrated in FIG. 1. In this mode of use, further, the tablet PC 2 can be folded toward the keyboard apparatus 3 as illustrated in FIG. 4.

Moreover, the mounting device 4 may be detached from the keyboard apparatus 3 while the tablet PC 2 is mounted on the mounting device 4 as illustrated in FIG. 3. This allows the electronic apparatus 1A to be used in the same fashion as a desktop-type PC is used. In this state also, the angle of the tablet PC 2 can be adjusted by use of the hinge parts 31A and 31B.

The use of the mounting device 4 as described above allows the tablet PC 2 and the keyboard apparatus 3 to be used in various modes of use, thereby improving the usability of the electronic apparatus 1A.

Figure 12:
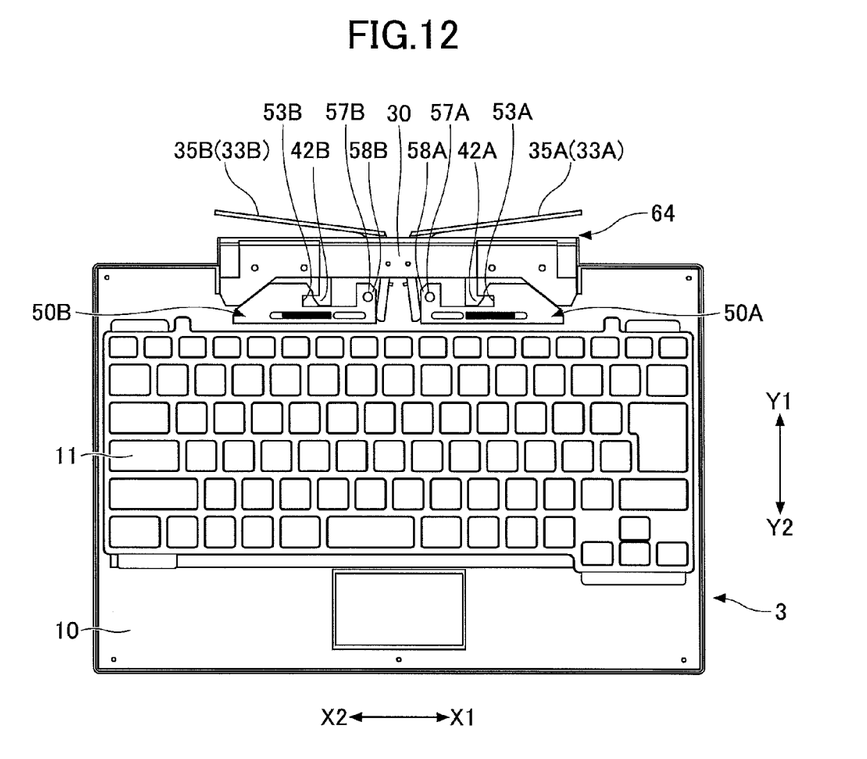
FIG. 12 is a plan view of another embodiment of a mounting device.
Figure 13:
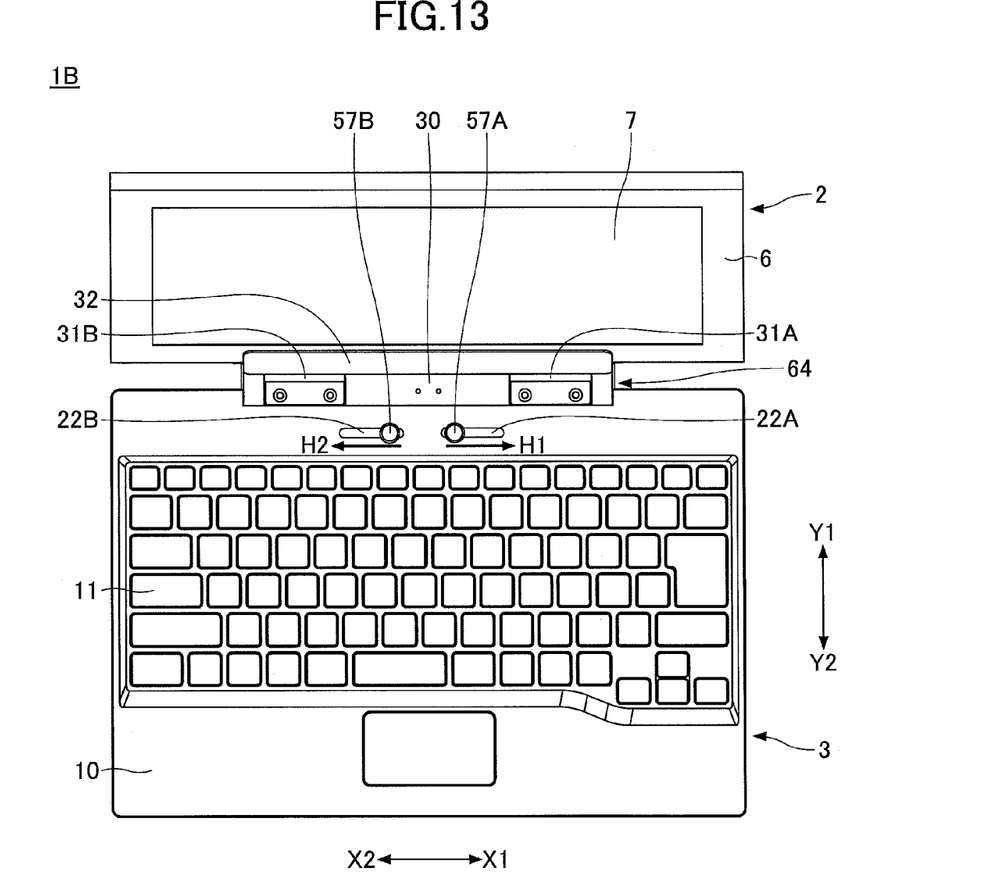
FIG. 13 is a plan view of another embodiment of an electronic apparatus.

FIG. 12 and FIG. 13 illustrate a mounting device and an electronic apparatus 1B according to another embodiment.

The mounting device 4 described in connection with FIG. 1 through FIG. 11 is configured such that a user operates the operating lever portions 35A and 35B of the respective lever members 33A and 33B in order to detach the mounting device 4 from the keyboard apparatus 3.

In the embodiment illustrated in FIG. 12 and FIG. 13, on the other hand, lock release pins 57A and 57B are formed on the slide members 50A and 50B, respectively. In order to detach a mounting device 64 from the keyboard apparatus 3, a user operates the lock release pins 57A and 57B to perform the detaching operation.

The lock release pins 57A and 57B are situated on the operated parts 58A and 58B, respectively, in the present embodiment. The positions of the lock release pins 57A and 57B are not limited on the operated parts 58A and 58B, respectively, but can be situated on any parts as long as the lock release pins 57A and 57B are disposed on the slide members 50A and 50B, respectively.

The lock release pins 57A and 57B have the lower ends thereof fixedly mounted on the operated parts 58A and 58B of the slide members 50A and 50B, respectively. The lock release pins 57A and 57B may be formed as a unitary, seamless structure with the slide members 50A and 50B, respectively, or may be parts separate from the slide members 50A and 50B, respectively. Elongated holes 22A and 22B are formed in the upper panel of the keyboard body 10, as illustrated in FIG. 13, at positions matching the positions of the lock release pins 57A and 57B, respectively.

The direction in which the elongated holes 22A and 22B extend is the same as the direction in which the slide members 50A and 50B move (i.e., the X1-X2 direction). The lock release pins 57A and 57B extend through the respective elongated holes 22A and 22B with the upper ends thereof being at higher elevation than the upper panel of the keyboard body 10.

In order to detach the mounting device 64 from the keyboard apparatus 3, the first lock release pin 57A protruding from the keyboard body 10 is moved along the first elongated hole 22A in the H1 direction illustrated in FIG. 13, and the second lock release pin 57B is moved along the second elongated hole 22B in the H2 direction.

Through these operations, the first slide member 50A slides in the X1 direction, and the second slide member 50B slides in the X2 direction. The mounting device 64 then operates similarly to the manner that was described in connection with FIG. 8 through FIG. 10, so that the mounting device 64 is detached from the keyboard apparatus 3.

In the present embodiment, the lock release pins 57A and 57B that are operated to detach the mounting device 64 from the keyboard apparatus 3 are situated on the keyboard body 10, which provides improved operability at the time of detachment.

In the embodiment illustrated in FIG. 12 and FIG. 13, the operating lever portions 35A and 35B may also be operated in the same manner as in the embodiment illustrated in FIG. 1 through FIG. 11 to detach the mounting device 64 from the keyboard apparatus 3.

Further, the present invention is not limited to these embodiments, but various variations and modifications may be made without departing from the scope of the present invention.

Although the above-described embodiments have been directed to examples in which the tablet PC 2 is detachably attached to the keyboard apparatus 3, an electronic apparatus to which the described mounting device is applied is not limited to the tablet PC 2 and the keyboard apparatus 3. For example, the mounting device 4 may be used to attach a plurality of tablet PCs.

Further, the slide springs 60A and 60B may not be provided in the respective elongated holes 52A and 52B formed in the slide members 50A and 50B, but may be situated in the periphery of the slide members 50A and 50B.

The present application is based on Japanese priority application No. 2013-164581 filed on Aug. 7, 2013, with the Japanese Patent Office, the entire contents of which are hereby incorporated by reference.

What is claimed is:

1. A mounting device, comprising:
a base member;
an attaching mechanism disposed on the base member and configured to detachably attach the base member to a first electronic apparatus; and
an accommodating part disposed on the base member and configured to hold a second electronic apparatus placed therein,
wherein the attaching mechanism includes:
an engaging part configured to be engaged with the first electronic apparatus to securely attach the base member to the first electronic apparatus; and
two lever members each rotatably disposed on the base member and each configured to be placed in a first positional state to extend along the base member when the engaging part is engaged with the first electronic apparatus, and further configured to be placed in a second positional state to extend from the base member at an angle relative to the base member, the two lever members being rotated from the first positional state to the second positional state to release engagement of the engaging part with the first electronic apparatus.

2. The mounting device as claimed in claim 1, wherein the base member together with the two lever members extending at the angle serves as a base to provide support for, and to provide placement of, the accommodating part when the mounting device is detached from the first electronic apparatus.

3. The mounting device as claimed in claim 1, wherein the first electronic apparatus is an inputting apparatus, and the second electronic apparatus is a tablet terminal apparatus.

4. An electronic apparatus, comprising:
a first electronic apparatus; and
a mounting device configured to be detachably attached to the first electronic apparatus and further configured to hold a second electronic apparatus placed therein,
wherein the mounting device includes:
a base member;
an attaching mechanism configured to detachably attach the base member to the first electronic apparatus; and
an accommodating part disposed on the base member and configured to hold the second electronic apparatus placed therein,
wherein the attaching mechanism includes:
a first engaging part configured to be engaged with the first electronic apparatus to securely attach the base member to the first electronic apparatus; and
two lever members each rotatably disposed on the base member and each configured to be placed in a first positional state to extend along the base member when the first engaging part is engaged with the first electronic apparatus, and further configured to be placed in a second positional state to extend from the base member at an angle relative to the base member, the two lever members being rotated from the first positional state to the second positional state to release engagement of the first engaging part with the first electronic apparatus.

5. The electronic apparatus as claimed in claim 4, wherein the attaching mechanism further includes a lever spring configured to urge the two lever members such that the two lever members are placed in the second positional state to extend from the base member at an angle relative to the base member when the mounting device is detached from the first electronic apparatus.

6. An electronic apparatus, comprising:
a first electronic apparatus; and
a mounting device configured to be detachably attached to the first electronic apparatus and further configured to hold a second electronic apparatus placed therein,
wherein the mounting device includes:
a base member;
an attaching mechanism configured to detachably attach the base member to the first electronic apparatus; and
an accommodating part disposed on the base member and configured to hold the second electronic apparatus placed therein,
wherein the attaching mechanism includes:
a first engaging part disposed on the base member;
a slide member slidably disposed in the first electronic apparatus, the slide member having a second engaging part configured to be engaged with the first engaging part; and
a first lever member rotatably disposed on the base member and extending in a first direction from a rotational center, the first lever member being configured to be engaged with the slide member;
a second lever member rotatably disposed on the base member and extending in a second direction from the rotational center,
wherein the second lever member is configured to extend from the base member in a supporting direction when the mounting device is detached from the first electronic apparatus, such that the second lever member extending in the supporting direction serves as a base to provide support for, and to provide secure placement of, the base member and the accommodating part.

* * * * *